Patented Oct. 17, 1950

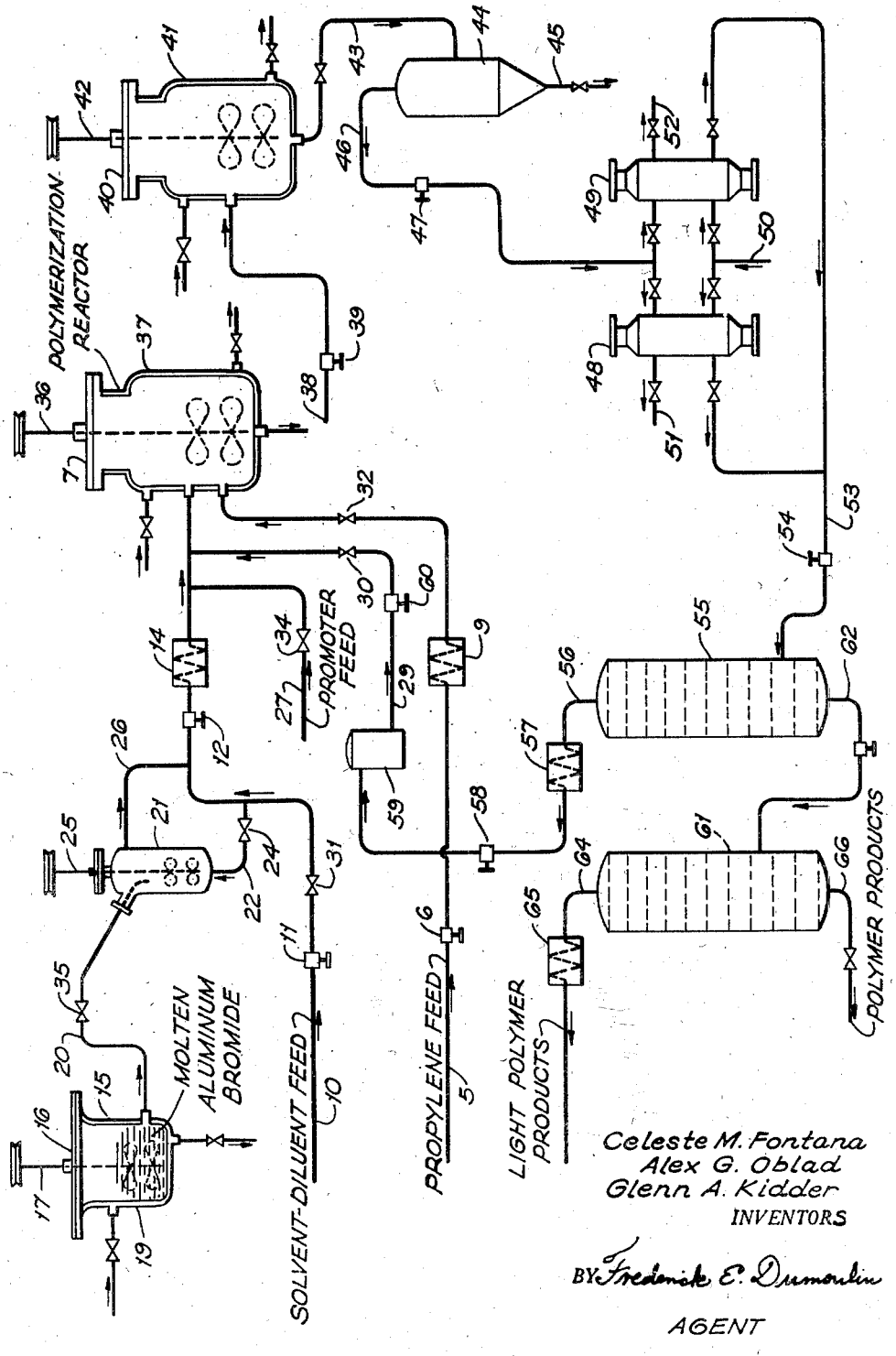

2,525,787

UNITED STATES PATENT OFFICE 2,525,787

PROPYLENE POLYMERIZATION PROCESS

Celeste M. Fontana, Pitman, N. J., Alex G. Oblad, Dallas, Tex., and Glenn A. Kidder, Harbel, Liberia, assignors, by mesne assignments, to Socony-Vacuum Oil Company, Incorporated, New York, N. Y., a corporation of New York Application October 31, 1947, Serial No. 783,320

14 Claims. (Cl. 260—683.15)

This invention relates to polymerization of olefins and relates more particularly to a process for the polymerization of propylene to produce polymer products having small changes in viscosity with changes in temperature.

It is well known that propylene can be polymerized in the presence of suitable catalysts to produce polymer products having viscosities ranging from those of light lubricating oils to those of heavy oils or even resins of plastic or semisolid nature. While these propylene polymer products have viscosities within the lubricating oil range or within the range of lubricating oil components, they have not attained wide acceptance as lubricating oils or lubricating oil components primarily because of their poor temperature-viscosity characteristics. Stated otherwise, these propylene polymers exhibit too great a change in viscosity with change in temperature, this characteristic being commonly expressed in terms of viscosity index (Dean and Davis, Chem. Met. Eng. 36, 318 (1929)), to make them acceptable for use under conditions where they will be subjected to wide variations in temperature, as, for example, in internal combustion engines. Thus, at low temperatures they have high viscosities, tending to make starting difficult and to prevent rapid flow to moving parts while at higher temperatures, such as the normal operating temperature of the engine, they have viscosities too low for efficient lubrication.

It is a primary object of this invention to provide a process for the production of propylene polymers having novel temperature-viscosity characteristics. It is another object of this invention to provide a process for the production of propylene polymers having small changes in viscosity with changes in temperature. It is another object of this invention to provide an improved process for the polymerization of propylene. It is another object of this invention to provide a process for the production of highly viscous polymers from propylene. It is another object of this invention to provide a process for the production of propylene polymers having high temperature-viscosity improving properties for blending with lubricating oil stocks. It is another object of this invention to provide propylene polymers having small changes in viscosity with changes in temperature. It is another object to afford propylene polymers suitable as lubricating oils or as blending agents in lubricating oils, particularly for use in internal combustion engines. It is another object to provide high viscosity propylene polymers. It is still another object of this invention to provide novel propylene polymers. Further objects of the invention will become apparent from the following description thereof.

In accordance with the invention, propylene polymers having small changes in viscosity with change in temperature are obtained in high yield by contacting propylene with aluminum bromide dissolved in a nonpolymerizing hydrocarbon solvent in the presence of a catalyst promoting agent and correlating reaction conditions with respect to the ratio of the amount of catalyst promoting agent to the amount of dissolved aluminum bromide and the ratio of the amount of propylene monomer to the amount of dissolved aluminum bromide in the reaction mixture during the course of the reaction.

Correlation of reaction conditions is an essential element of the process producing the desired propylene polymer products. We have found that the essential reaction conditions producing the desired polymers are the ratio of promoter to dissolved aluminum bromide and the ratio of propylene monomer to dissolved aluminum bromide. Since the rate at which the propylene polymerizes is not readily ascertainable, it becomes impracticable to attempt to set out the ratio of total olefin monomer in the reaction mixture to dissolved aluminum bromide, and we therefore prefer to express this ratio as the rate at which the propylene monomer is added to the dissolved aluminum bromide.

The desired propylene polymer products, having temperature-viscosity characteristics hereinafter defined, are obtained by employing a mol ratio of promoter, measured as hydrogen bromide, to dissolved aluminum bromide of between about 0.2 to 5, and preferably between about 0.5 to 2.5, and a rate of addition of propylene to dissolved aluminum bromide not greater than 2, and preferably not greater than 1 mol of propylene per mol of dissolved aluminum bromide per minute.

Commonly, temperature-viscosity characteristics of lubricating oils have been expressed in terms of viscosity index. High viscosity index oils have small changes in viscosity with changes in temperature and low viscosity index oils have large changes in viscosity with changes in temperature. Viscosity index is calculated by comparison with arbitrarily selected natural reference oils and the viscosity index system of classification is quite satisfactory for those oils having viscosities comparable to the viscosities of the natural reference oils. However, for heavier lubricating oils having comparatively small changes in viscosity with changes in temperature, the viscosity system is unsatisfactory because it is not highly indicative of small differences in temperature-viscosity characteristics in the high viscosity range. Accordingly, recourse has been taken to the method of defining temperature-viscosity characteristics proposed by Walther (Erdol u. Teer 4, Nr. 29, 30 (1928), 5, Nr. 34 (1929), 7, 383 (1931)) which specifies the slope $m$ of the curve on a chart having as coordinates: $W = \log \log (Cst + 0.8)$ and $\log T$, where Cst is viscosity in centistokes and T is the absolute temperature on the Fahrenheit scale. This constant $m$ is essentially the slope of the viscosity curve on the A. S. T. M. Viscosity-Temperature Chart. The constant $m$ will therefore be given by the expression $$m = \frac{W_1 - W_2}{\log T_2 - \log T_1}$$

where $W_1$ and $W_2$ are calculated from the viscosity in centistokes at the temperatures $T_1$ and $T_2$ respectively, $T_2$ being the higher temperature. For the purposes of this invention, $T_2$ will be regarded as 669.7° (210° F.) and $T_1$ will be regarded as 559.7° (100° F.). It will be seen from this expression that those lubricating oils having better viscosity-temperature characteristics, i. e., those having smaller changes in viscosity with temperature, will have smaller values of $m$. In the present application, use will be made of these $m$ values for characterizing the propylene polymers.

It will be realized that, for purposes of evaluating a lubricating oil in any particular type of lubrication operation or to compare two different oils with respect to fundamental properties, viscosity-temperature characteristics do not supply the complete answer since the absolute value of the viscosity at some given temperature must also be taken into consideration. For example, for some particular type of lubrication operation, an oil having a small change of viscosity with temperature may be required but unless the oil has, in addition to the required viscosity-temperature characteristics, a satisfactory viscosity at the maximum temperature of operation, or at the minimum temperature of operation as the case may be, it will not be satisfactory for the purpose. It thus becomes necessary in characterizing or comparing lubricating oils to define their properties not only by change of viscosity with temperature but also by viscosity at some particular temperature. Thus, oils have been characterized by giving their viscosities at 210° F. and their change in viscosity with temperature in terms of viscosity index, or as mentioned above, to avoid the drawbacks of the viscosity index system, in terms of their $m$ values.

The propylene polymer products produced by the process of the present invention comprise polymers having such viscosities and viscosity-temperature characteristics that their $m$ values will be numerically smaller than the $m$ value given by the expression $$m = 3.850 - 1.794 W$$

although not smaller than about 2.50. In this expression, $W = \log \log (Cst_{210°F.} + 0.8)$. $Cst_{210°F.}$ in the latter expression is the viscosity of the polymer in centistokes at 210° F. These propylene polymers produced by the process of the invention have $m$ values that are appreciably smaller than those of propylene polymers heretofore known of similar 210° F. viscosities. They are exceptionally suited for admixture or blending with natural mineral oils or other types of oils since, in view of the superior viscosity-temperature characteristics of the polymers, the blends will have superior viscosity-temperature characteristics. These blends, and the polymers themselves where their viscosities are proper, are particularly suited for use as automobile engine oils, aviation engine oils, etc.

The propylene polymers produced by the process of the present invention have viscosities at 210° F. ranging between 30 and 10,000 Saybolt Universal seconds. The equivalent values for $W$ at 210° F. will be between $-0.350$ and $+0.670$, respectively, and, in accordance with the foregoing expression for $m$, will have $m$ values smaller than 4.48 and 2.65, respectively. The products produced by the process of the invention include polymers having 210° F. viscosities in excess of 1,000 S. U. S. and in excess of 5,000 S. U. S., for example, between 5,000 S. U. S. and 10,000 S. U. S.

In carrying out the process of the invention, we prefer to employ hydrogen bromide as the catalyst promoting agent. However, bromo-alkanes containing at least three carbon atoms, such as propyl, isopropyl, butyl, isoamyl, etc. bromo-alkanes, and compounds which react under the conditions of the polymerization reaction, for example, by reaction with aluminum bromide, to produce hydrogen bromide are also effective. The mechanism of the catalyst promoting effect of the bromo-alkanes is not well understood although it appears that, since aluminum bromide is known to catalyze the dehydrobromination of bromo-alkanes, dehydrobromination of the bromo-alkanes may occur to form olefins and hydrogen bromide, the hydrogen bromide thereupon acting as the effective promoter. However, at low temperatures, equilibria do not favor dehydrobromination and at these temperatures it is possible that the promoting effect may be due to copolymerization of the bromo-alkanes to produce a polymer and hydrogen bromide. It is also possible that the bromo-alkanes are in themselves promoting agents, and that where hydrogen bromide is present, a bromo-alkane is formed by reaction of the hydrogen bromide and the propylene which thereupon acts as the catalyst promoting agent.

The concentration of dissolved aluminum bromide should be sufficiently high to catalyze the polymerization reaction. An upper limit to catalyst concentration is placed primarily by the fact that in order to obtain maximum utilization of the catalyst a larger amount of propylene must be added to the reaction mixture with higher catalyst concentrations, and the addition of large amounts of propylene to the reaction mixture produces a highly viscous mixture which is difficult to handle during the later operations of clarification, solvent recovery, etc. Preferably, we employ a catalyst concentration, based upon the total non-polymerizing hydrocarbon in the reaction mixture, of between .01 and 1.5 mol per cent. However, it will be understood that the maximum concentration of aluminum bromide that may be employed will be limited by the solubility of the aluminum bromide in the particular solvent at the temperature of polymerization employed.

The amount of hydrogen bromide promoter to be employed, as mentioned hereinabove, will be between 0.2 and 5.0 mo's, preferably 0.5 to 2.5 mols of hydrogen bromide per mol of dissolved aluminum bromide. When employing bromo-alkanes, etc., the mol ratio of these compounds to dissolved aluminum bromide may be the same numerically as the mol ratio of hydrogen bromide to dissolved aluminum bromide just mentioned. When employing, as catalyst promoting agents, compounds which react to form hydrogen bromide, such as water, etc., which react with the aluminum bromide to form hydrogen bromide, an amount should be used which will give upon reaction the above mentioned ratios of hydrogen bromide to dissolved aluminum bromide.

It is possible to carry out the reaction either as a batch or a continuous operation. In batch operation, the propylene may be added to the reaction vessel containing the dissolved aluminum bromide plus the proper amount of promoter. In this type of operation, the reaction vessel will contain a known amount of dissolved aluminum bromide, and the propylene may be added thereto at the desired rate within the limits above mentioned. In continuous operation, the propylene and the dissolved aluminum bromide plus the proper amount of promoter in admixture with the propylene or as a separate stream are added simultaneously to the reaction vessel, and a stream of reaction mixture is removed continuously therefrom. In this latter type of operation, the reaction vessel will be filled with reaction mixture and, for any given ratio of rates of flow of the respective streams entering therein, will contain a known quantity of dissolved aluminum bromide. Thus, suitable adjustment of the rates of flow of the respective streams will result in addition of propylene to the reaction vessel at the desired rate with respect to the aluminum bromide concentration.

The liquid catalyst may be prepared by dissolving the aluminum bromide in any suitable type of nonpolymerizing hydrocarbon solvent. Examples of suitable hydrocarbon solvents are the saturated hydrocarbon solvents such as ethane, propane, normal butane, etc. Mixtures of one or more solvents may also be employed, if desired, for preparing the liquid catalyst.

It is preferred to carry out the polymerization reaction in the presence of a diluent for the propylene. The saturated hydrocarbons employed as solvents for the aluminum bromide are satisfactory as diluents for the propylene, and mixtures of two or more of the saturated hydrocarbons may be used if desired. Ethylene may also be used as a diluent where the reaction conditions are such that it will be nonpolymerizing in the presence of the liquid catalyst, as, for example, at temperatures of polymerization of the order of −40° C. or lower.

In both batch and continuous operation, one type of hydrocarbon may be employed as diluent and another type of hydrocarbon may be employed as solvent for preparing the liquid catalyst. However, it will usually be more convenient to employ the same type of hydrocarbon as diluent and as solvent, particularly in large scale operations, in order to simplify the later procedures of recovering the solvent and recovering the diluent for reuse. In the case of low temperature polymerization, on the other hand, it may frequently be advantageous to use a solvent of moderate volatility, such as normal butane, to prepare the liquid catalyst, and a highly volatile diluent, such as ethane, capable of use for evaporative cooling to control the temperature of the polymerization reaction. The liquid catalyst may be added to part or all of the diluent, whether or not the same type of hydrocarbon is used as solvent for preparing the liquid catalyst and as diluent, and the mixture will serve in the capacity of both liquid catalyst and diluent. In this manner of operation, the mixture may be regarded as a liquid catalyst-diluent.

The process of the invention may be carried out at any desired temperature. Temperatures between about −80° C. to +30° C. are satisfactory although higher and lower temperatures may be employed, if desired. As hereinabove mentioned, the viscosities of the propylene polymers obtained increase as the temperature of polymerization is decreased. Accordingly, in order to obtain a propylene polymer of desired viscosity, proper selection of polymerization temperature must be made. At temperatures of polymerization between about −80° C. and −10° C. or higher, polymer products having viscosities considerably above those of natural lubricating oils, suitable as lubricating oil blending agents, lubricating oil viscosity index improvers, or resins are obtained. At higher temperatures of polymerization, for example, from about −10° C. to about 20° C., polymers suitable as heavy lubricating oils or lubricating oil blending agents are obtained, while, at higher temperatures, polymers suitable as lubricating oils are obtained.

The aluminum bromide may be dissolved by stirring the solid compound with the saturated hydrocarbon solvent. However, solid aluminum bromide is difficult to handle and to dissolve, and it is preferred to effect solution by melting the aluminum bromide by heating to a temperature of about 98° C. or higher and thereafter mixing while in the molten state with the saturated hydrocarbon solvent. The mixing is preferably carried out in a closed vessel or chamber whereby loss of saturated hydrocarbon as a result of heating by the molten aluminum bromide is avoided.

In carrying out the polymerization reaction, the reactants before being charged to the reactor are preferably brought to the desired reaction temperature. The polymerization reaction is exothermic, and, if desired, the temperature of the reaction mixture may be maintained at the desired reaction temperature by means of external heat exchangers, as, for example, by employing a jacketed reaction vessel, or by employing heat exchanger coils within the reaction vessel through which suitable refrigerants may be passed. If desired, evaporative cooling may be employed. At very low temperatures of reaction, an internal refrigerant such as solid carbon dioxide may be added to the reaction mixture to provide refrigeration or to supplement the cooling provided by other means.

Pressures to be employed should be sufficient to keep the solvent-diluent in the liquid phase at the particular temperature of polymerization selected. The propylene may be admitted to the reactor in either the gas phase or the liquid phase. Where it is desired to admit the propylene in the gas phase, the pressure within the reactor may be maintained sufficiently high to keep the solvent-diluent in the liquid phase but sufficiently low to keep the propylene in the gas phase at the temperature of admission.

Following polymerization, any catalyst tar in the reactor effluent may be removed by settling. The dissolved aluminum bromide may then be removed from the reaction mixture and recovered for reuse, if desired. A suitable procedure for removing the dissolved aluminum bromide comprises extracting the reaction mixture with a hydrocarbon immiscible liquid in which the aluminum bromide is more soluble than in the reaction mixture. The hydrocarbon immiscible liquid may be formed by admixing at room temperature about 70 parts by weight of a metallic halide, preferably aluminum bromide, with 30 parts by weight of a hydrocarbon liquid, preferably highly branched, such as iso-octane or turpentine, for a period of time sufficient to form a homogeneous liquid. Another procedure for removing the dissolved aluminum bromide comprises heating the reactor effluent to a high temperature, for example, about 80° C., for a sufficiently long period of time whereby the dissolved aluminum bromide forms with the solvent and diluent employed an insoluble tar which may be removed by settling. Where this procedure is employed, the removal of catalyst tar formed during the reaction may be postponed until after the dissolved aluminum bromide is converted into tar and removed along with this additional tar. It may be uneconomical to continue heating the reactor effluent for a sufficient period of time to completely remove the dissolved aluminum bromide as insoluble tar. In such cases, heating may be continued for a time sufficient to remove the greater proportion of the dissolved aluminum bromide after which the reaction mixture may be treated with water, alkali, alcohol, etc., to inactivate the catalyst. Thereafter, the reaction products of the dissolved aluminum bromide and the inactivating agent may be removed by washing, filtering, or other suitable procedure. The portion of the dissolved aluminum bromide remaining after heat treatment may also be inactivated by treating the reaction products with activated clay such as bentonite provided such clay is not anhydrous. Such clays ordinarily contain sufficient water to inactivate the remaining portion of dissolved aluminum bromide and, when spent, may be regenerated with steam for further inactivation of catalyst. This latter procedure of inactivating dissolved aluminum bromide has the advantage of concomitantly clarifying the reaction products. Such clarification of the reaction products may be desirable irrespective of the method employed for removing dissolved aluminum bromide, and the same types of clay as those mentioned above may be employed where clarification alone is the object to be achieved, although regeneration with steam will not be required. Following clarification, whether or not concomitant with removal of dissolved aluminum bromide, the reaction products may be subjected to fractionation, steam distillation, or other suitable procedure to remove solvent, diluent, and any light hydrocarbon reaction products from the desired polymer product.

The aluminum bromide removed by extraction of the reaction products with a hydrocarbon immiscible liquid or in the form of tar may be recovered therefrom for reuse by suitable procedures of heating followed by condensation of the volatilized aluminum bromide. Where the reaction products contain only small amounts of aluminum bromide, recovery of the aluminum bromide for reuse may not be economically desirable. In such cases, the reaction products may be treated with water, alkali, alcohol, etc., to react with the entire amount of aluminum bromide.

Hydrogen bromide promoter in the reaction effluent will be largely contained in the catalyst tar and will therefore be largely removed along with the tar. The remaining portion of the hydrogen bromide promoter will be removed from the reactor effluent during fractionation, steam distillation, or otherwise for the removal of solvent, diluent, and any light hydrocarbon products. Where bromo-alkanes are employed as promoters, they likewise will be largely contained in the catalyst tar and will be largely removed from the reactor effluent along with catalyst tar, and the remainder will be removed during the procedures for the removal of solvent or diluent in similar manner to the hydrogen bromide. Where compounds reacting to form hydrogen bromide are employed as promoters, any solid residue such as aluminum hydroxide will be removed by filtration, and any liquid reaction products will be removed along with the solvent or diluent. Should any hydrogen bromide remain in the polymer product after removal of the solvent and diluent, it will be removed at the temperatures subsequently employed in fractionation for separation of light polymer products from the desired heavier polymer products. For fractionation from the desired polymer product of any light polymer products that may be formed, low pressures are maintained within the fractionation apparatus to obtain effective separation without the use of high temperatures conducive to cracking of the polymer product. Temperatures not above about 300° C. are satisfactory, and the pressure within the apparatus may be progressively decreased, as the fractionation proceeds, to a pressure of about 1 millimeter of mercury at the end of the fractionation operation.

The accompanying drawing is a flow sheet illustrating one embodiment of my invention.

Referring now to the drawing, propylene feed enters the system through line 5 and is pumped by means of pump 6 to polymerization reactor 7. Before entering the polymerization reactor, the propylene feed passes through heat exchanger 9 in line 5, where it is heated or cooled to the desired reaction temperature. The solvent-diluent feed enters the system through line 10 and is pumped by means of pumps 11 and 12 to the polymerization reactor 7, being heated or cooled to the desired reaction temperature before entering the reaction by passage through heat exchanger 14 in line 10.

Solid aluminum bromide is melted in melter 15 provided with cover 16, stirrer 17, and heating jacket 19 through which steam or other suitable heating medium may be passed. The molten aluminum bromide is passed out of the melter 15 through line 20 to mixing drum 21 where it is dissolved in a portion of the solvent-diluent feed by-passed from line 10 through line 22 provided with valve 24. To assist in solution of the aluminum bromide, the solvent-diluent and molten aluminum bromide in drum 21 is stirred by means of stirrer 25. The dissolved aluminum bromide is then passed from the mixing drum through line 26 to the main portion of the solvent-diluent feed in line 10.

Hydrogen bromide promoter is fed to the system through line 27 connected to line 10 entering the polymerization reactor 7. Recycle solvent-diluent obtained in the manner to be hereinafter explained enters line 10 through line 29 and passes into polymerization reactor 7. Line 29 is provided with flow control valve 30 and diluent feed line 10 is provided with flow control valve 31 for control of the total amount of solvent-diluent entering the reactor 7. Propylene feed line 5 is provided with flow control valve 32, hydrogen bromide feed line 27 is fitted with flow control valve 34, and molten aluminum bromide line 20 is fitted with flow control valve 35. By suitable manipulation of these flow control valves, the proper ratio of hydrogen bromide to aluminum bromide, the desired concentration of aluminum bromide, and the proper rate of propylene feed to aluminum bromide concentration is obtained in the polymerization reactor 7.

The solvent-diluent feed containing the dissolved aluminum bromide and hydrogen bromide is intimately mixed with the propylene in the reactor 7 by means of stirrer 36. To maintain the reactants at the desired polymerization temperature, a suitable heating or cooling medium is conducted through jacket 37. The polymerization reaction products are withdrawn from the reactor 7 through line 38 and pumped by means of pump 39 to heating vessel 40 wherein the reaction products are heated to precipitate the dissolved aluminum bromide by formation of insoluble tar with the solvent-diluent. Heating vessel 40 is provided with a jacket 41 through which a suitable heating medium such as steam may be circulated and with a stirrer 42 to obtain efficient heat transfer between the walls of the vessel and the polymerization reaction products. The mixture of reaction products and insoluble tar is passed through line 43 to separator 44 wherein the tar formed during the polymerization reaction and in heating vessel 40 settles to the bottom of the separator. The tar is withdrawn from the separator through line 45 and may then be sent, if desired, to a recovery system (not shown) for recovery of the aluminum bromide.

The polymerization reaction products now free of the greater proportion of dissolved aluminum bromide leave the separator through line 46 and are pumped by means of pump 47 through clay chambers 48 and 49 for removal of the remainder of the dissolved aluminum bromide and for clarification. Chambers 48 and 49 are connected in parallel and provided with suitable valves in order that continuous operation may be obtained by leaving one chamber on stream while the other chamber is taken off stream for refilling or for regeneration of the clay. Regeneration of the clay for removal of the remaining portion of dissolved aluminum bromide in the reaction products is effected by passing steam through either chamber when off stream from steam inlet line 50 to the steam outlet lines 51 and 52 in chambers 48 and 49, respectively.

The clarified products from the clay chambers pass through line 53 and are pumped by pump 54 to fractionating column 55 where the solvent-diluent and the greater part of any remaining hydrogen bromide promotor are removed as overhead through line 56. The overhead passes through condenser 57 wherein the solvent-diluent is condensed and cooled to the desired reaction temperature in reactor 7, and the condensate is pumped by pump 58 to receiver 59. From receiver 59, the solvent-diluent is pumped by means of pump 60 through line 29 to line 10 for recycle to the polymerization reactor 7. The recycle solvent-diluent may contain some hydrogen bromide which enters the polymerization reactor in addition to the hydrogen bromide fed into the reactor from line 27. Accordingly, this amount of hydrogen bromide must be taken into account when controlling the amount of hydrogen bromide fed from line 27 to obtain the desired ratio of hydrogen bromide to aluminum bromide.

The bottoms from fractionating column 55 comprise the desired polymer product and any light polymer products formed during the reaction. In addition, the bottoms contain any hydrogen bromide promotor not removed during the fractionation operation. The bottoms are transferred through line 62 to fractionation column 61 where the light polymer products are removed as overhead through line 64 and condensed in condenser 65 to be utilized as desired. Fractionation column 61 is operated at a much higher temperature than fractionation column 55 and at a low pressure, and any hydrogen bromide promoter not removed in column 55 will be removed in column 61 as overhead with the light polymer products. The desired polymer product is removed as bottoms from column 61 through line 66.

The above-described procedure is susceptible of various modifications. For example, in place of employing the clay chambers 48 and 49, the polymerization reaction products in line 46 may be clarified by admixing with clay and thereafter filtering the clay therefrom. Additionally, if desired, the polymerization products issuing as bottoms from the fractionating column 55 may be steam distilled or otherwise treated for removal of any light polymer products. These and other modifications are possible, and they, as well as the necessary provision of apparatus and lines, may be readily made by those skilled in the art.

The following examples are illustrative of the types of products obtainable by the process of the invention. In each example, propylene was passed into an enclosed, jacketed reactor along with catalyst promoting agent and normal butane containing dissolved aluminum bromide. The reactor was glass lined and was fitted with a stirrer. The reactor contents were maintained at the reaction temperature by fluid circulation through the jacket and precooling of the reactants was employed. Precautions were taken to prevent contact of the reactor contents with moist air to avoid reaction with the aluminum bromide thereby forming hydrogen bromide. Reactor effluent was discharged into a Dewar vessel and admixed with isopropyl alcohol to quench and precipitate the dissolved aluminum bromide. The clear supernatant liquid was decanted and the remainder of the product mixture clarified with bentonite clay. The product mixture was then stripped to a temperature of 180° C. at 1 mm. pressure. The reaction conditions and the results are set forth in Table I. Yields in each example were approximately 98% by weight based upon the amount of propylene charged.

Table I

| Example Number | Temperature, °C. | Conc. of AlBr₃, Mols/Mol Solvent | Ratio of Promoter to AlBr₃, Mols Promoter Added/Mol AlBr₃ | Rate of Addition, Mols Propylene/Mol AlBr₃/min. | Viscosity at 210° F. | | Viscosity at 100° F. | | W at 210° F. | m as calculated | m from formula m=3.850−1.794W |
|---|---|---|---|---|---|---|---|---|---|---|---|
| | | | | | S. U. S. | Cst. | S. U. S. | Cst. | | | |
| 1 | 19.0° | 0.0021 | 1.01 | 0.513 | 50.6 | 7.47 | 298 | 64.5 | −0.043 | 3.87 | 3.96 |
| 2 | 1.7° | 0.00231 | 1.02 | 0.286 | 51.7 | 7.8 | 327 | 70.8 | −0.034 | 3.87 | 3.91 |
| 3 | 26° | 0.0100 | 1.00 | 0.196 | 121 | 24.5 | 1,501 | 325 | 0.146 | 3.26 | 3.59 |
| 4 | 0.0° | 0.0100 | 1.51 | 0.201 | 131 | 27.5 | 2,498 | 541 | 0.161 | 3.54 | 3.56 |
| 5 | −2.9° | 0.020 | 0.55 | 0.103 | 603 | 129 | 22,880 | 4,950 | 0.325 | 3.11 | 3.27 |
| 6 | −1.0° | 0.010 | 1.50 | 0.194 | 998 | 214 | 32,640 | 7,065 | 0.368 | 2.79 | 3.19 |
| 7 | −2.0° | 0.010 | 1.02 | 0.198 | 1,391 | 298 | 81,900 | 17,720 | 0.394 | 3.01 | 3.14 |
| 8 | −2.0° | 0.0162 | 1.40 | 0.112 | 1,395 | 299 | 37,700 | 8,167 | 0.394 | 2.55 | 3.14 |
| 9 | −2.2° | 0.010 | 1.00 | 0.204 | 1,542 | 331 | 58,700 | 12,695 | 0.402 | 2.72 | 3.13 |
| 10 | −5.5° | 0.00163 | 0.928 | 0.203 | 1,702 | 365 | 106,500 | 23,070 | 0.409 | 2.96 | 3.12 |
| 11 | −1.0° | 0.010 | 1.80 | 0.197 | 1,766 | 378 | 67,200 | 14,540 | 0.411 | 2.67 | 3.11 |
| 12 | −2.0° | 0.010 | 1.50 | 0.197 | 2,178 | 468 | 110,380 | 23,892 | 0.427 | 2.76 | 3.08 |
| 13 | −6.0° | 0.00326 | 0.917 | 0.206 | 2,246 | 482 | 164,600 | 35,620 | 0.429 | 2.94 | 3.08 |
| 14 | −40° | 0.0125 | 1.23 | 0.984 | 4,450 | 954 | 440,500 | 95,350 | 0.474 | 2.85 | 3.00 |
| 15 | −20° | 0.010 | 1.55 | 0.198 | 5,191 | 1,112 | 465,000 | 98,480 | 0.483 | 2.77 | 2.98 |
| 16 | −30° | 0.00163 | 0.290 | 0.190 | 6,242 | 1,338 | 669,000 | 144,700 | 0.497 | 2.78 | 2.96 |

In Example 6, the promoter was isoamyl bromide.
In Example 12, the promoter was isopropyl bromide.
In all other examples, the promoter was hydrogen bromide.

In order to more clearly indicate the improved results to be obtained by the process of the invention, the following examples are given wherein the reaction conditions employed were outside the limits hereinabove set forth. The examples were carried out in substantially the same manner as described above in connection with the examples in Table I. The reaction conditions and the results are set forth in Table II.

Table II

| Example Number | Temperature, °C. | Conc. of AlBr₃, Mols/Mol Solvent | Ratio of Promoter to AlBr₃, Mols Promoter Added/Mol AlBr₃ | Rate of Addition, Mols Propylene/Mol AlBr₃/min. | Viscosity at 210° F. | | Viscosity at 100° F. | | W at 210° F. | m as calculated | m from formula m=3.850−1.794W |
|---|---|---|---|---|---|---|---|---|---|---|---|
| | | | | | S. U. S. | Cst. | S. U. S. | Cst. | | | |
| 17 | 31.5 | 0.000895 | 0 | 2.04 | 135.5 | 28.09 | 3,203 | 693.2 | 0.164 | 3.71 | 3.56 |
| 18 | 23 | 0.0050 | 1.30 | 8.84 | 375 | 80.2 | 18,870 | 4,085 | 0.281 | 3.55 | 3.35 |
| 19 | 11.7 | 0.00041 | 0 | 1.31 | 448 | 96.2 | 26,038 | 5,636 | 0.298 | 3.55 | 3.32 |
| 20 | −30 | 0.00163 | 0.61 | 5.09 | 930 | 199 | 87,000 | 18,830 | 0.362 | 3.45 | 3.20 |
| 21 | −30 | 0.00228 | 0 | 0.95 | 1,094 | 234 | 116,600 | 25,240 | 0.375 | 3.45 | 3.18 |
| 22 | −30 | 0.00217 | 0 | 3.05 | 1,153 | 247 | 141,000 | 30,500 | 0.379 | 3.50 | 3.17 |

In each example, the promoter was hydrogen bromide.

It will be seen from Table I that the $m$ values of the polymer products of the invention are lower than the $m$ values obtained from the expression $$m = 3.850 - 1.794W$$

Also, it will be seen from Table II that the $m$ values of the polymer products produced by processes other than that disclosed in the present application are higher than those obtained from the expression.

Having thus described our invention, it is to be understood that such description has been given by way of illustration and example only and not by way of limitation, reference for the latter purpose being had to the appended claims.

We claim:

1. A process for the production of a propylene polymer having a change in viscosity with temperature smaller than that given by the expression $$m = 3.850 - 1.794W$$

where $$m = \frac{\log \log (\mathrm{Cst}_{T_1} + 0.8) - \log \log (\mathrm{Cst}_{T_2} + 0.8)}{\log T_2 - \log T_1}$$

and $W = \log \log (\mathrm{Cst}_{T_2} + 0.8)$, $T_1$ being 559.7° and $T_2$ being 669.7°, which comprises admixing propylene, aluminum bromide dissolved in a non-polymerizing hydrocarbon solvent, and a catalyst promoter selected from the group consisting of hydrogen bromide, bromo-alkanes containing at least three carbon atoms, and compounds which react under the conditions of the reaction to produce hydrogen bromide, in a polymerization reaction zone, in proportions such that during the course of the reaction, the mol ratio of catalyst promoter to dissolved aluminum bromide in the polymerization reaction zone will be between 0.2 and 5.0 and the rate of addition of propylene to dissolved aluminum bromide in the polymerization reaction zone will be not greater than 2 mols of propylene per mol of dissolved aluminum bromide per minute.

2. The process of claim 1 wherein the non-polymerizing hydrocarbon solvent is a low boiling saturated hydrocarbon solvent.

3. The process of claim 1 wherein the non-polymerizing hydrocarbon solvent is normal butane.

4. The process of claim 1 wherein the non-polymerizing hydrocarbon solvent is propane.

5. The process of claim 1 wherein the catalyst promoter is hydrogen bromide.

6. A process for the production of a propylene polymer having a change in viscosity with temperature smaller than that given by the expression $$m = 3.850 - 1.794W$$

where $$m = \frac{\log \log (\mathrm{Cst}_{T_1} + 0.8) - \log \log (\mathrm{Cst}_{T_2} + 0.8)}{\log T_2 - \log T_1}$$

and $W = \log \log (\mathrm{Cst}_{T_2} + 0.8)$, $T_1$ being 559.7° and $T_2$ being 669.7°, which comprises admixing propylene with aluminum bromide dissolved in a nonpolymerizing hydrocarbon solvent at a rate not greater than 2 mols of propylene per mol of aluminum bromide per minute and maintaining in said reaction mixture hydrogen bromide in a concentration between about 0.2 and 5.0 mols per mol of aluminum bromide.

7. A process for the production of a propylene polymer having a change in viscosity with temperature smaller than that given by the expression $$m = 3.850 - 1.794W$$

where $$m = \frac{\log \log (Cst_{T_1} + 0.8) - \log \log (Cst_{T_2} + 0.8)}{\log T_2 - \log T_1}$$

and $W = \log \log (Cst_{T_2} + 0.8)$, $T_1$ being 559.7° and $T_2$ being 669.7°, which comprises admixing propylene, aluminum bromide dissolved in a nonpolymerizing hydrocarbon solvent, and a catalyst promoter selected from the group consisting of hydrogen bromide, bromo-alkanes containing at least three carbon atoms, and compounds which react under the conditions of the reaction to produce hydrogen bromide, in a polymerization reaction zone, in proportions such that during the course of the reaction, the mol ratio of catalyst promoter to dissolved aluminum bromide in the polymerization reaction zone will be not greater than 1 mol of propylene per mol of dissolved aluminum bromide per minute.

8. A process for the production of a propylene polymer having a change in viscosity with temperature smaller than that given by the expression $$m = 3.850 - 1.794W$$

where $$m = \frac{\log \log (Cst_{T_1} + 0.8) - \log \log (Cst_{T_2} + 0.8)}{\log T_2 - \log T_1}$$

and $W = \log \log (Cst_{T_2} + 0.8)$, $T_1$ being 559.7° and $T_2$ being 669.7°, which comprises adding propylene to aluminum bromide dissolved in a nonpolymerizing hydrocarbon solvent at a rate not greater than 2 mols of propylene per mol of dissolved aluminum bromide per minute, said dissolved aluminum bromide containing between 0.2 and 5.0 mols for each mol of dissolved aluminum bromide of a catalyst promoter selected from the group consisting of hydrogen bromide, bromo-alkanes containing at least three carbon atoms, and compounds which react under the conditions of the reaction to produce hydrogen bromide.

9. A process for the production of a propylene polymer having a change in viscosity with temperature smaller than that given by the expression $$m = 3.850 - 1.794W$$

where $$m = \frac{\log \log (Cst_{T_1} + 0.8) - \log \log (Cst_{T_2} + 0.8)}{\log T_2 - \log T_1}$$

and $W = \log \log (Cst_{T_2} + 0.8)$, $T_1$ being 559.7° and $T_2$ being 669.7°, comprising dissolving aluminum bromide in a nonpolymerizing hydrocarbon solvent to produce dissolved aluminum bromide, passing said dissolved aluminum bromide to a polymerization reaction zone, adding a catalyst promoter selected from the group consisting of hydrogen bromide, bromo-alkanes containing at least three carbon atoms, and compounds which react under the conditions of the reaction to produce hydrogen bromide, into said dissolved aluminum bromide in an amount between 0.2 and 5.0 mols of catalyst promoter per mol of dissolved aluminum bromide, passing propylene into said polymerization reaction zone at a rate not greater than 2 mols of propylene per minute per mol of dissolved aluminum bromide contained in said polymerization reaction zone, removing effluent from said polymerization reaction zone, removing nonpolymerizing hydrocarbon solvent from said effluent, recycling said solvent to dissolve further amounts of said aluminum bromide catalyst, removing light polymer products from said effluent, and recovering from said effluent propylene polymer product.

10. A continuous process for the production of a propylene polymer having a change in viscosity with temperature smaller than that given by the expression $$m = 3.850 - 1.794W$$

where $$m = \frac{\log \log (Cst_{T_1} + 0.8) - \log \log (Cst_{T_2} + 0.8)}{\log T_2 - \log T_1}$$

and $W = \log \log (Cst_{T_2} + 0.8)$, $T_1$ being 559.7° and $T_2$ being 669.7°, which comprises passing to a polymerization reaction zone a stream of aluminum bromide dissolved in a nonpolymerizing hydrocarbon solvent and simultaneously passing to said polymerization reaction zone a stream of catalyst promoter selected from the group consisting of hydrogen bromide, bromo-alkanes containing at least three carbon atoms, and compounds which react under the conditions of the reaction to produce hydrogen bromide, at a rate between 0.2 and 5.0 mols of catalyst promoter per mol of dissolved aluminum bromide and a stream of propylene at a rate not greater than 2 mols of propylene per mol of dissolved aluminum bromide per minute.

11. As a composition of matter, a propylene polymer having a change in viscosity with temperature smaller than that given by the expression $$m = 3.850 - 1.794W$$

where $$m = \frac{\log \log (Cst_{T_1} + 0.8) - \log \log (Cst_{T_2} + 0.8)}{\log T_2 - \log T_1}$$

and $W = \log \log (Cst_{T_2} + 0.8)$, $T_1$ being 559.7° and $T_2$ being 669.7°, said propylene polymer being obtained by the process which comprises admixing propylene, aluminum bromide dissolved in a nonpolymerizing hydrocarbon solvent, and a catalyst promoter selected from the group consisting of hydrogen bromide, bromo-alkanes containing at least three carbon atoms, and compounds which react under the conditions of the reaction to produce hydrogen bromide, in a polymerization reaction zone, in proportions such that during the course of the reaction, the mol ratio of catalyst promoter to dissolved aluminum bromide in the polymerization reaction zone will be between 0.2 and 5.0 and the rate of addition of propylene to dissolved aluminum bromide in the polymerization reaction zone will be not greater than 2 mols of propylene per mol of dissolved aluminum bromide per minute.

12. As a composition of matter, a propylene polymer having a viscosity at 210° F. between 30 Saybolt Universal seconds and 10,000 Saybolt Universal seconds and having a change in viscosity with temperature smaller than that given by the expression $$m = 3.850 - 1.794W$$

where $$m = \frac{\log \log (Cst_{T_1} + 0.8) - \log \log (Cst_{T_2} + 0.8)}{\log T_2 - \log T_1}$$

and $W = \log \log (Cst_{T_2}+0.8)$, $T_1$ being 559.7° and $T_2$ being 669.7°, said propylene polymer being obtained by the process which comprises admixing propylene, aluminum bromide dissolved in a non-polymerizing hydrocarbon solvent, and a catalyst promoter selected from the group consisting of hydrogen bromide, bromo-alkanes containing at least three carbon atoms, and compounds which react under the conditions of the reaction to produce hydrogen bromide, in a polymerization reaction zone, in proportions such that during the course of the reaction, the mol ratio of catalyst promoter to dissolved aluminum bromide in the polymerization reaction zone will be between 0.2 and 5.0 and the rate of addition of propylene to dissolved aluminum bromide in the polymerization reaction zone will be not greater than 2 mols of propylene per mol of dissolved aluminum bromide per minute.

13. As a composition of matter, a propylene polymer having a 210° F. viscosity in excess of 1,000 Saybolt Universal seconds and having a change in viscosity with temperature smaller than that given by the expression $$m = 3.850 - 1.794 W$$

where $$m = \frac{\log \log (Cst_{T_1}+0.8) - \log \log (Cst_{T_2}+0.8)}{\log T_2 - \log T_1}$$

and $W = \log \log (Cst_{T_2}+0.8)$, $T_1$ being 559.7° and $T_2$ being 669.7°, said propylene polymer being obtained by the process which comprises admixing propylene, aluminum bromide dissolved in a non-polymerizing hydrocarbon solvent, and a catalyst promoter selected from the group consisting of hydrogen bromide, bromo-alkanes containing at least three carbon atoms, and compounds which react under the conditions of the reaction to produce hydrogen bromide, in a polymerization reaction zone, in proportions such that during the course of the reaction, the mol ratio of catalyst promoter to dissolved aluminum bromide in the polymerization reaction zone will be between 0.2 and 5.0 and the rate of addition of propylene to dissolved aluminum bromide in the polymerization reaction zone will be not greater than 2 mols of propylene per mol of dissolved aluminum bromide per minute.

14. As a composition of matter, a propylene polymer having a 210° F. viscosity in excess of 5,000 Saybolt Universal seconds and having a change in viscosity with temperature smaller than that given by the expression $$m = 3.850 - 1.794 W$$

where $$m = \frac{\log \log (Cst_{T_1}+0.8) - \log \log (Cst_{T_2}+0.8)}{\log T_2 - \log T_1}$$

and $W = \log \log (Cst_{T_2}+0.8)$, $T_1$ being 559.7° and $T_2$ being 669.7°, said propylene polymer being obtained by the process which comprises admixing propylene, aluminum bromide dissolved in a non-polymerizing hydrocarbon solvent, and a catalyst promoter selected from the group consisting of hydrogen bromide, bromo-alkanes containing at least three carbon atoms, and compounds which react under the conditions of the reaction to produce hydrogen bromide, in a polymerization reaction zone, in proportions such that during the course of the reaction, the mol ratio of catalyst promoter to dissolved aluminum bromide in the polymerization reaction zone will be between 0.2 and 5.0 and the rate of addition of propylene to dissolved aluminum bromide in the polymerization reaction zone will be not greater than 2 mols of propylene per mol of dissolved aluminum bromide per minute.

CELESTE M. FONTANA.
ALEX G. OBLAD.
GLENN A. KIDDER.

REFERENCES CITED

The following references are of record in the file of this patent:

UNITED STATES PATENTS

| Number | Name | Date |
|---|---|---|
| 2,317,878 | Bannon | Apr. 27, 1943 |
| 2,397,945 | Burney et al. | Apr. 9, 1946 |
| 2,401,933 | Hersberger | June 11, 1946 |

OTHER REFERENCES

Thomas, Anhydrous Aluminum Chloride in Organic Chemistry, Reinhold Publ. Corp. (1941), page 875.